(12) United States Patent
Goonetilleke et al.

(10) Patent No.: US 11,751,653 B2
(45) Date of Patent: Sep. 12, 2023

(54) PROTECTIVE CASE WITH INTEGRATED HAND STRAP

(71) Applicants: Nigel Chicca Goonetilleke, Los Alamitos, CA (US); Edward Ralph Schwarz, Santa Fe Springs, CA (US)

(72) Inventors: Nigel Chicca Goonetilleke, Los Alamitos, CA (US); Edward Ralph Schwarz, Santa Fe Springs, CA (US)

( * ) Notice: Subject to any disclaimer, the term of this patent is extended or adjusted under 35 U.S.C. 154(b) by 60 days.

(21) Appl. No.: 17/409,070

(22) Filed: Aug. 23, 2021

(65) Prior Publication Data

US 2023/0056720 A1 Feb. 23, 2023

(51) Int. Cl.
*A45C 11/00* (2006.01)
*G06F 1/16* (2006.01)

(52) U.S. Cl.
CPC ............ *A45C 11/00* (2013.01); *G06F 1/1628* (2013.01); *A45C 2011/003* (2013.01); *A45C 2200/15* (2013.01)

(58) Field of Classification Search
CPC .... G06F 1/1628; G06F 1/1613; G06F 1/1633; A45C 11/00; A45C 2011/003; A45C 2200/15; A45C 13/30
USPC ........................................ 206/320, 521, 586
See application file for complete search history.

(56) References Cited

U.S. PATENT DOCUMENTS

| | | | | |
|---|---|---|---|---|
| 8,120,896 B2* | 2/2012 | Mori | .......................... | A45F 5/00 190/110 |
| 8,469,189 B2* | 6/2013 | Liang | ..................... | G06F 1/1656 206/320 |
| 8,954,124 B2* | 2/2015 | Webber | .............. | B65D 63/1018 455/575.8 |
| 10,201,221 B1* | 2/2019 | Chang | ....................... | A45F 5/10 |
| 10,542,804 B1* | 1/2020 | Wang | ................... | H04B 1/3888 |
| 11,284,694 B1* | 3/2022 | Chan | .................... | H04B 1/3888 |
| 2015/0036291 A1* | 2/2015 | Yuan | ...................... | G06F 1/1628 361/690 |
| 2015/0214992 A1* | 7/2015 | Gant | ......................... | A45F 5/10 455/575.6 |
| 2017/0311704 A1* | 11/2017 | Geller | ..................... | A45C 13/30 |
| 2019/0116944 A1* | 4/2019 | Dickerson | ............. | G06F 1/1628 |
| 2019/0243419 A1* | 8/2019 | Charlesworth | ......... | A45C 11/00 |
| 2020/0170392 A1* | 6/2020 | Freimuth | ................... | A45F 5/00 |
| 2020/0295795 A1* | 9/2020 | Fathollahi | ............ | H04B 1/3888 |
| 2022/0035482 A1* | 2/2022 | Williams | .............. | G06F 1/1626 |

* cited by examiner

*Primary Examiner* — Rafael A Ortiz

(57) ABSTRACT

The present disclosure relates to a resilient protective case for mobile computer devices. In particular, the protective case includes a unitary body having a one piece assembly. The unitary body includes an outer frame having retaining members for securing the mobile computer device therein and a backside support member disposed between two side portions of the outer frame. The backside support member includes an upper slot and a lower slot. An integrated strap is disposed in the backside support member, separating the upper slot from the lower slot.

18 Claims, 20 Drawing Sheets

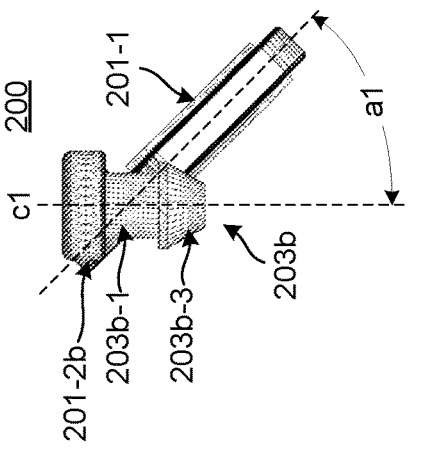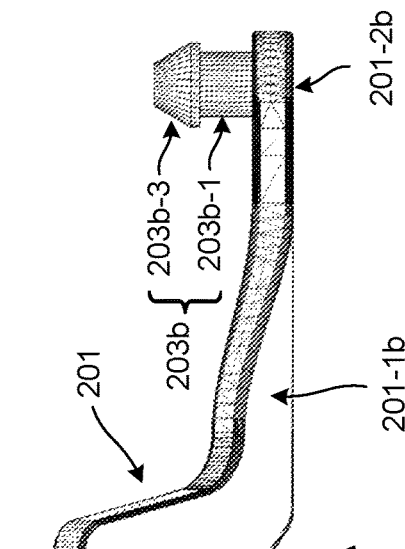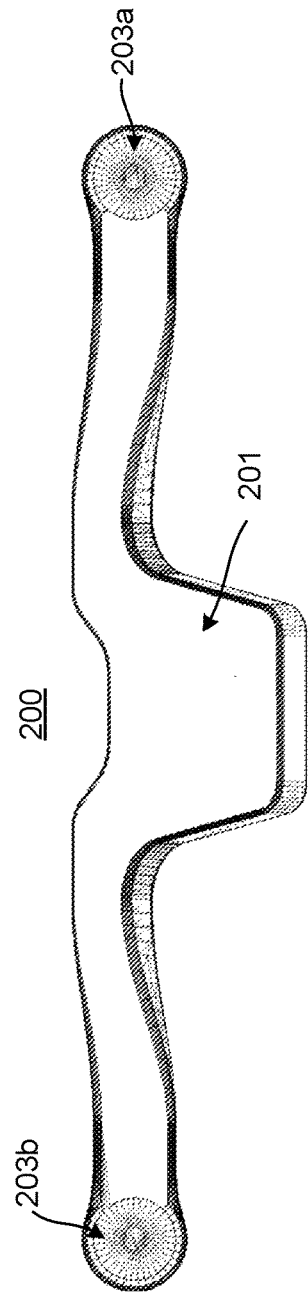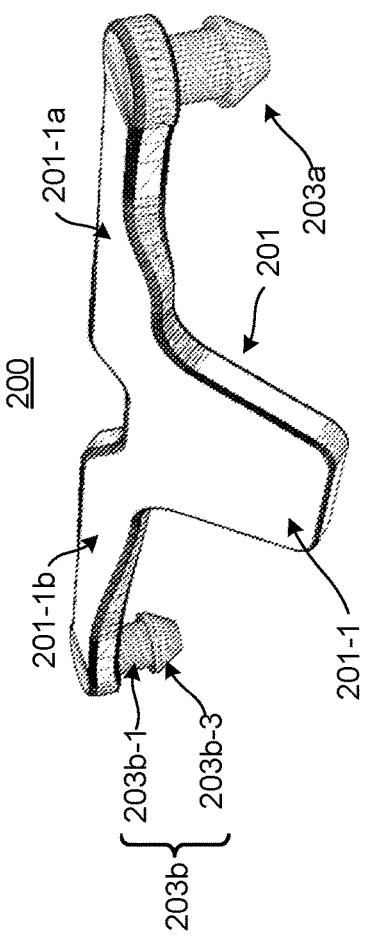
FIG. 10C
FIG. 10A
FIG. 10B
FIG. 10D

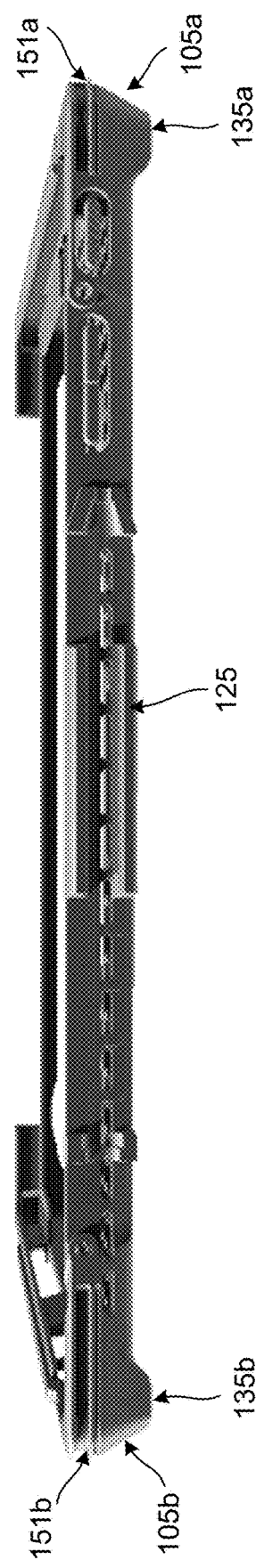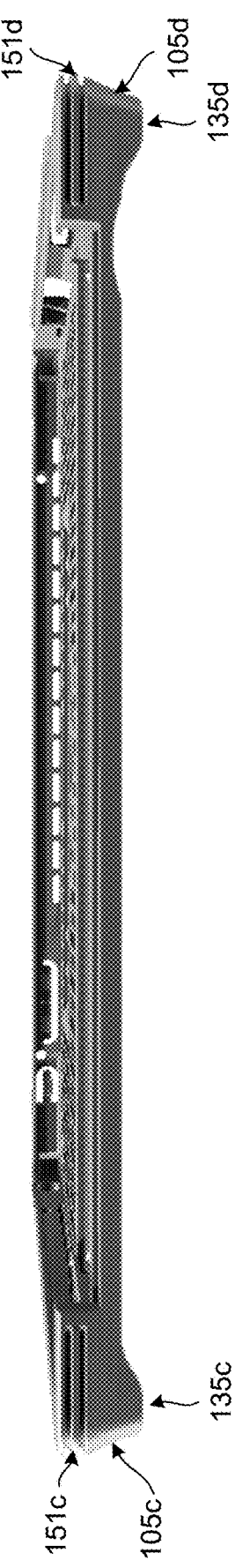

PROTECTIVE CASE WITH INTEGRATED HAND STRAP

FIELD OF THE DISCLOSURE

The present disclosure relates to a resilient protective case for mobile computer devices. In particular, the protective case includes a unitary body having shock resistant properties and a fully integrated hand strap formed in the unitary body for comfortably carrying mobile computer devices such as tablets, laptops, and mobile phones.

BACKGROUND

Protective cases provide an external cover that attach to an outer body of mobile computer devices, protecting these devices from damage caused by accidently dropping or directly impacting the surface of these devices.

Some conventional protective cases include molded shells, outer coverings, or sleeves which are designed to fully encase the device, being constructed from materials such as a cloth, foam, rubber, leather, or plastic. In addition, some of these cases are designed and manufactured to be waterproof, lightweight, and shock resistant, allowing users to easily secure, store, and transport these mobile device.

Though most if not all of these types of conventional protective cases offer users some protection from scratches and damages to mobile devices, they often require additional manufacturing steps such as an overmolding process to include other valuable features to the case. The process of overmolding, for example, typically requires two or more different materials in combination in order to fabricate and create a single part. Typically the first material, also called a substrate, is partially or fully covered by a second material (or overmold material) during the fabrication process. Next, the substrate portion is placed into an injection molding equipment at which point the overmold material is injected, fully covering and encasing the substrate (first material). Afterwards, the overmold material cures and solidifies over time, thereby forming a single part from the two separate materials. In addition to overmolding processes, conventional protective computer cases may require other types of fabrication steps such as riveting, adhering, or mechanically sewing other components to the protective case which requires a separate installation step. In turn, the time and manufacturing costs for adding such features generally increases resulting in lower profit margins to manufacture such products.

Therefore, it would be highly desirable to have a resilient protective case with enhanced features, requiring minimal fabrication techniques, and thereby reducing overall manufacturing costs.

SUMMARY

It is an advantage of the present disclosure to provide a protective case for receiving and protecting a mobile computer device, having a unitary body which includes a one piece assembly in which the unitary body may include an outer frame having retaining members for securing the mobile computer device therein, a backside support member disposed between two lateral frame members of the outer frame where the backside support member may include an upper slot and a lower slot, and an integrated strap disposed in the backside support member, where the upper slot may be separated from the lower slot by the integrated strap.

In one embodiment, corrugated expansion members may be disposed at distal end portions of the integrated strap. In another embodiment, the corrugated expansion members may be configured to outwardly expand with minimal tensional forces to the integrated strap, reducing stress to the integrated strap when a hand is inserted therein. In yet another embodiment, a hand insertion ramp may have a gradually sloping plane is disposed below the integrated strap and the lower slot. The hand insertion ramp may also provide an entry point for lifting the integrated strap along the lower slot by a hand of a user.

In one aspect, the outer frame may be substantially rectangular in shape having four corners with shock-absorbing corner members disposed along each of the four corners.

Each of the shock-absorbing corner member may include ribbed members having raised bands or alternating stacked layers for increasing strength and impact-absorbing properties along each of the four corners. In addition, each shock-absorbing corner member may have a hollow interior forming air pockets for the purpose of absorbing impact and reducing shock along each of the four corners.

In another aspect, keyboard restraining slots may be disposed along a top portion and two lateral frame portions of the outer frame. Furthermore, a 4-point keyboard restraining system may have a pair of keyboard restraining bands which can be applied to upper corners of the unitary body.

These and other objects, features and advantages of the present disclosure will become more apparent in light of the following detailed description of preferred embodiments thereof, as illustrated in the accompanying drawings.

BRIEF DESCRIPTION OF THE DRAWINGS

The present disclosure will be more clearly understood from the following detailed description of the preferred embodiments of the disclosure and from the attached drawings, in which:

FIG. 10A-FIG. 10D illustrate a front, top, side, and perspective views of a keyboard restraining band which is configured to be applied to the pair of restraining slots and disposed on the resilient protective case, according to an embodiment.

FIG. 18A-FIG. 18B illustrate a top view and bottom view of three-dimensional images of the resilient protective case, according to an embodiment.

In the appended figures, one or more elements may have the same reference numeral in different figures indicating previously described.

DETAILED DESCRIPTION

Figure 1:
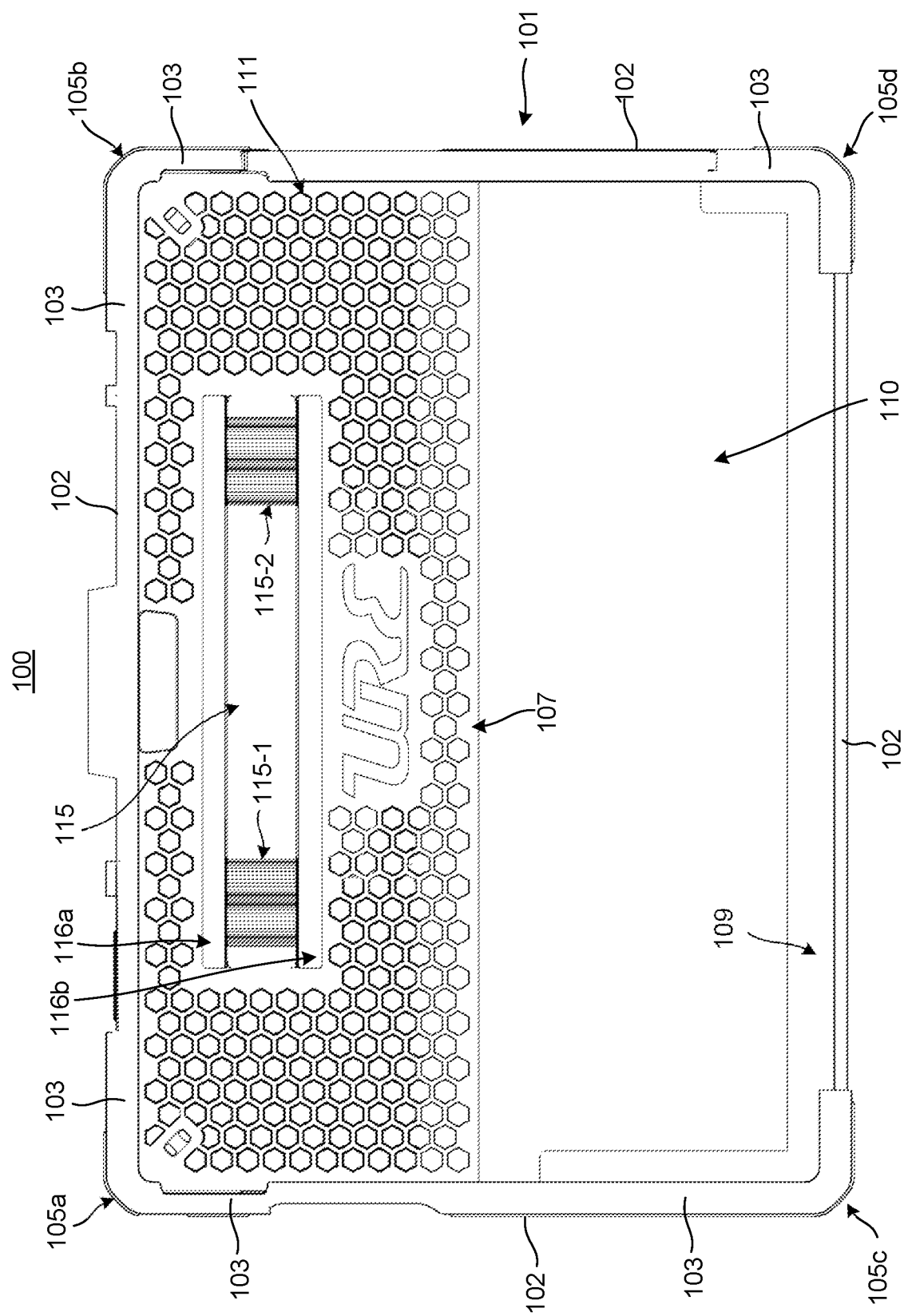
FIG. 1 illustrates a front side view of a resilient protective case, according to an embodiment.

FIG. 1 illustrates a front side view of a resilient protective case 100, according to an embodiment. The protective case 100 includes a unitary body 101 having an outer frame 102 and multiple members for encasing and protecting a mobile computer device (not shown). These mobile computer devices may include, for example, computer tablets, laptops, or other portable computer device cases having a lightweight and substantially thin profile design. At least a portion of the unitary body 101 is molded, contoured, and shaped to cooperatively fit and receive an outer shell of the mobile computer device in which it encases. For example, the unitary body 101 may be generally rectangular in shape, as shown, for receiving and protecting mobile computer devices having similar dimensions and rectangular shape. In other examples, the unitary body 101 may molded into other shapes such as ovals, squares, triangles, or circular designs, for encasing and supporting mobile computer devices having corresponding case designs. The unitary body 101 can be fabricated by a plastic material such as thermoplastic elastomer (TPE) or thermoplastic polyurethane (TPU) using an injection molding process. Advantageously, the molding process of the unitary body 101 can be carried out by a single piece mold set, without the need for any subsequent or overmold processing, to fabricate the unitary body, allowing reduced manufacturing cost and complexity and increased manufacturing efficiencies and throughput rates. Preferred materials for manufacturing the unitary body 101 may include thermoplastic materials such as, for example, Thermoplastic Elastomer (TPE) and Thermoplastic Polyurethane (TPU). Both TPE and TPU compounds are known to offer excellent durability, flexibility, and elasticity. Also, both materials are typically ideal for use in extrusion, injection molding, and other plastics molding applications. In common applications, both material classes generally will not lose their structural integrity over time and can maintain their form and flexibility over many cycles of deformation and use. With excellent properties like flexibility, dimensional stability, and ease of manufacturability, both TPE and TPU are preferred plastic materials for fabricating many consumer products.

Figure 2:
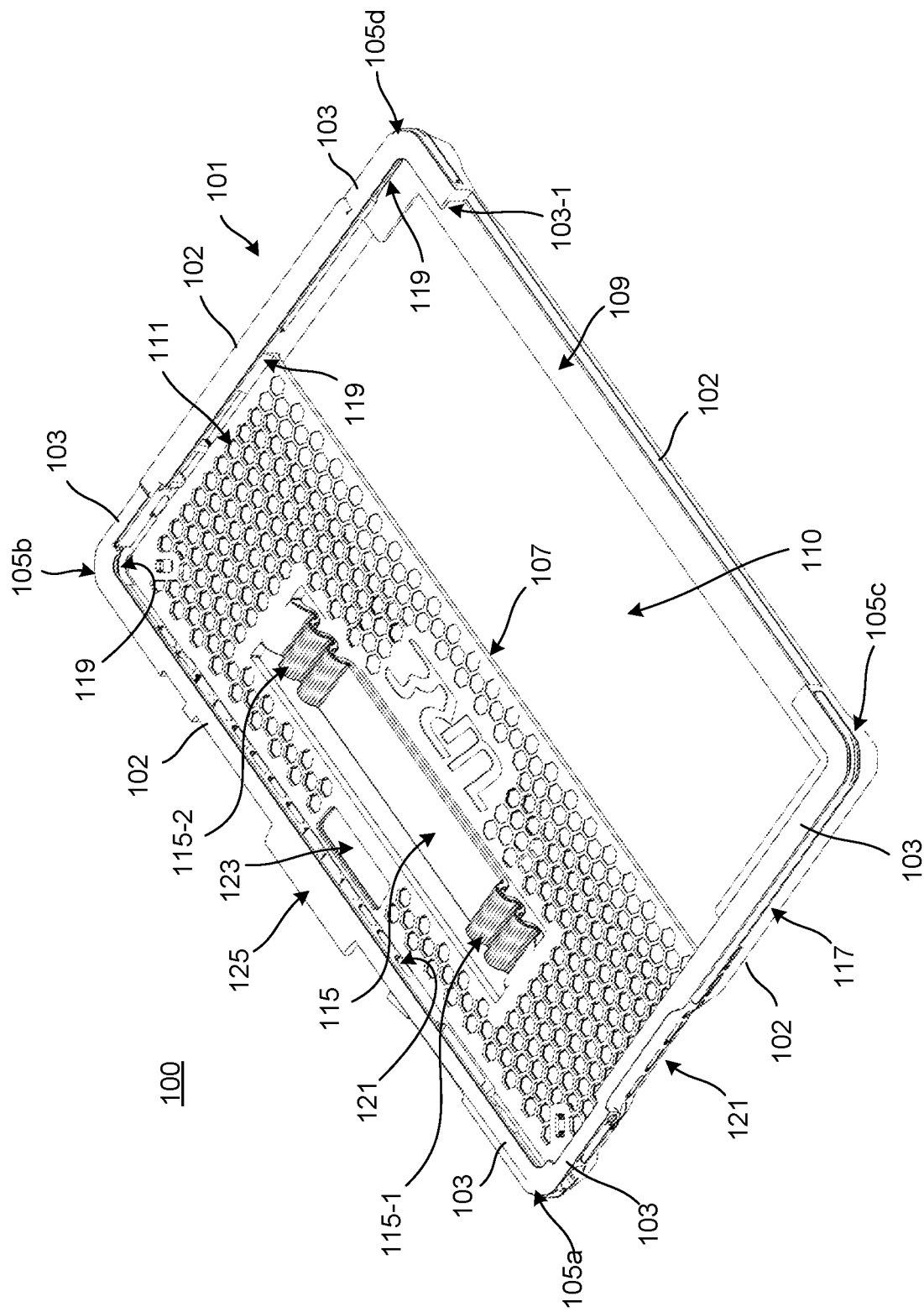
FIG. 2 illustrates a front perspective view of the resilient protective case showing other pertinent features of the unitary body, according to an embodiment.

Referring again to FIG. 1, the unitary body 101 may include a front-facing retaining member 103 extending along a portion of the outer frame 102, multiple corners having shock-absorbing corner members (105a-d) disposed along each corner of the outer frame 102, a back support member 107 disposed along an upper portion of the outer frame 102 of the unitary body 101, extending between two lateral frame members of the outer frame 102, and a lower retaining member 109 disposed along a lower portion of the outer frame 102, extending between the two lateral frame members of the outer frame 102. The back support member 107 may have a thin and flexible body containing several hexagonal (or honeycomb) air pocket structures 111 that are integrated into and uniformly distributed across an interior portion of the back support member 107, providing energy-absorbing properties that are capable of withstanding shock and impact. In operation, the hexagonal structures 111 are configured to hold pockets of air which are designed to trap air between the computer and the back support member 107 in order to absorb shock. The back support member 107 may also include a one-piece integrated hand strap 115 formed along a center portion of the back support member 107, having two hand insertion slots (upper hand insertion slot 116a and lower hand insertion slot 116b) adjacent to the hand strap 115. The strap 115 may have corrugated expansion members (115-1, 115-2) disposed along each end of the integrated hand strap 115. In operation, the strap 115 is designed to experience some degree of elastic deformation under stress (e.g., when a hand is inserted into the strap 115 via the two hand insertion slots 116a, 116b), allowing the strap to return to its original state when stress is released (e.g., when the hand is removed from the strap 115). To reduce the stress on the strap 115 corrugated expansion members (115-1, 115-2) are formed along each end of the strap 115, allowing it to outwardly expand with minimal tensional forces to the strap 115, thereby reducing wear and tear, and increasing longevity to the strap. In another implementation, a kickstand slot 110 may be disposed below the back support member 107 which provides an opening for a built-in kickstand disposed on the mobile computer device that allows a user to set the device on a table or lap at an angle. FIG. 2 illustrates a front perspective view of the resilient protective case 100 showing other pertinent features of the unitary body 101, according to an embodiment. For example, the outer frame 102 may also include an upwardly extending peripheral member 117 forming a sidewall disposed along an outer perimeter of the front-facing retaining member 103, connecting the back support member 107 and the lower retaining member 109 along the outer perimeter of the front-facing retaining member 103. A projecting edge or brim 103-1 is also disposed along an inner perimeter of the front-facing retaining member 103, and an inner channel 119 is formed along portions of the front-facing retaining member 103. In one instance, a portion of the inner channel 119 may be formed by a section of the brim 103-1 of the front-facing retaining member 103, the peripheral member 117, and the lower retaining member 109. In another instance, another portion of the inner channel 119 may be also formed by another section of the brim 103-1 of the front-facing retaining member 103, the peripheral member 117, and the back support member 107. The inner channel 119 is generally configured as a retaining structure having a u-channel, a c-channel, or a tapered slot design for receiving and securing an outer edge portion of the mobile computer device when encased therein.

In another embodiment, other structural elements of the unitary body 101 may include multiple air vents 121 disposed along a side portion and a top portion of the outer frame 102 proximate to the back support member 107. In operation, the air vents 121 provide openings for allowing continuous air flow and cooling directly to ventilation ports disposed along a periphery of the housing of the mobile computer device when encased by the protective case 100. Other ancillary structural elements of the unitary body 101 may include a camera slot 123 for providing an opening through which videos and/or images of a camera of the mobile computer device is viewed and captured, and a stylus pen slot 125 in the form of a cylindrical c-clip or u-clip retainer for attaching an optional stylus pen (not shown) to the protective case 100.

Figure 3:
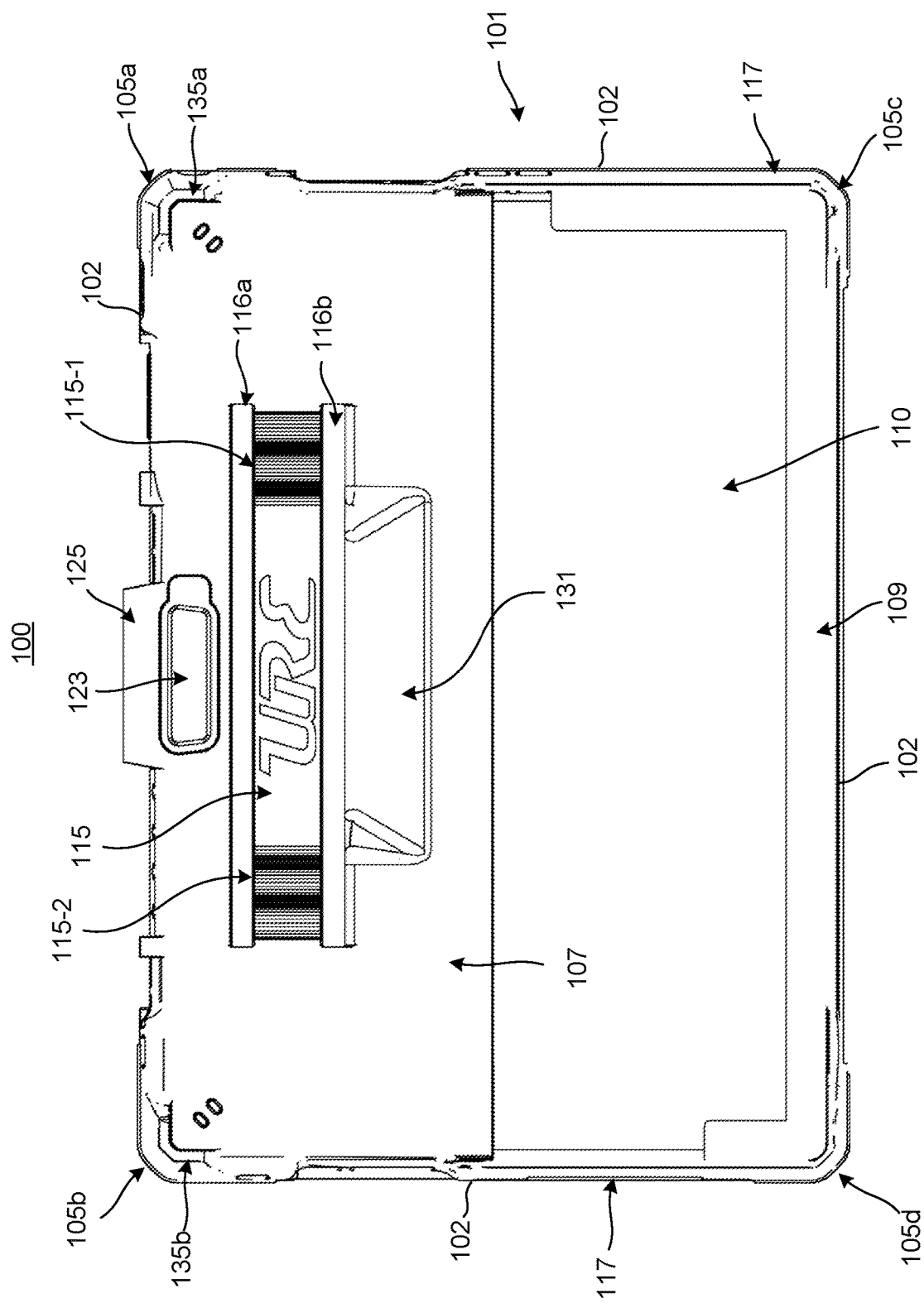
FIG. 3 illustrates a back side view of the resilient protective case, according to an embodiment.

FIG. 3 illustrates a back side view of the resilient protective case 100, according to an embodiment. As shown in FIG. 3, additional structural elements on an exterior side of the resilient protective case 100 are revealed. For example, an exterior side of the back support member 107 includes a hand insertion ramp 131 that is formed and disposed below the strap 115 and the lower hand insertion slot 116*b*. The hand insertion ramp 131 is configured to have a sloping surface connecting a lower exterior planar surface of the back support member 107 to the lower hand insertion slot 116*b*, allowing the hand insertion ramp 131 to be a point of entry for the hand of the user to easily and comfortably lift the strap 115 through the lower hand insertion slot 116*b* by slipping the fingers beneath the strap 115 through the two hand insertion slots (116*a*, 116*b*). Advantageously, the integrated and gradually sloping plane of the hand insertion ramp 131 is structurally configured to provide the user a quick and smooth surface for guiding the fingers into the two hand insertion slots (116*a*, 116*b*) with minimal resistance or interference with the strap 115 when the user slips their fingers underneath the strap 115. In another implementation, a top surface portion of the hand insertion ramp 131 may have tactile dimples or bumps embedded into the surface of the hand insertion ramp 131 for guiding the fingers into a mid-section of the slot 116*b*. In yet another implementation, a textured pattern may be embedded in the surface of the hand insertion ramp 131 as a tactile reference for guiding the fingers into the slot 116*b*.

Figure 4:
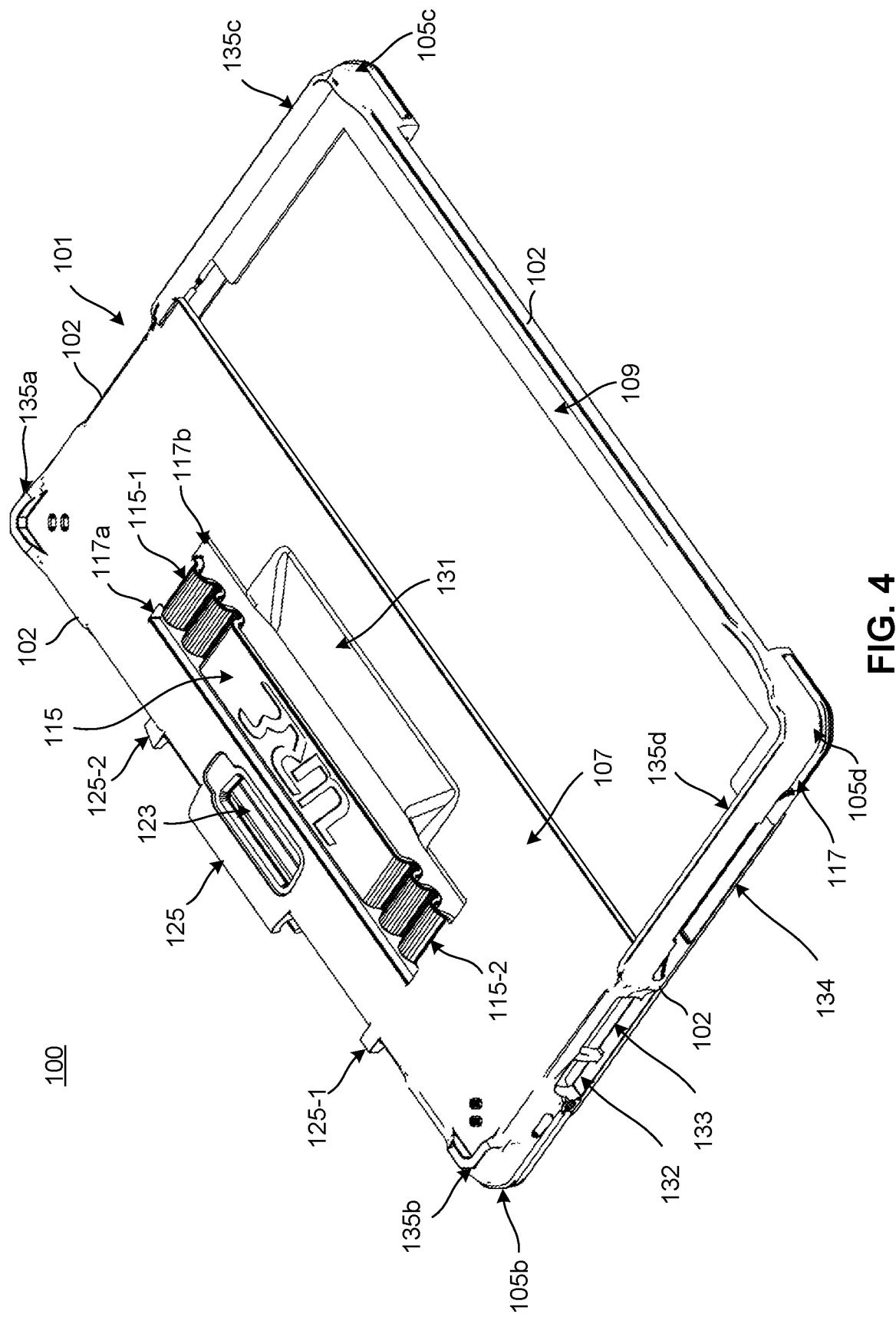
FIG. 4 illustrates a perspective back side view of the resilient protective case, according to an embodiment.

FIG. 4 illustrates a perspective back side view of the resilient protective case 100, according to an embodiment. As shown in FIG. 4, additional structural elements on an exterior perspective side of the resilient protective case 100 are revealed. For example, the unitary body 101 may include multiple slots including two serial slots (132, 133) and a single power/memory card slot 134 disposed along a portion of the outer frame 102, permitting openings formed in the unitary body 101 for allowing serial port connectors (USB-A, USB-C), a power connector, and memory card to connect to corresponding serial ports, power adapter, and memory card on the mobile computer device when encased by the resilient protective case 100. In another embodiment, the unitary body 101 may also include multiple post members (135*a*, 135*b*, 135*c*, and 135*d*) formed and disposed along a bottom outer edge and corners of the outer frame 102 for raising the back side of the resilient protective case 100, including the back support member 107, above a planar surface when placed thereon. The post members (135*a*, 135*b*, 135*c*, and 135*d*) may be structured as steps, pedestals, bars, or any other stand members for offsetting and raising the back side of the resilient protective case 100 above the surface. In addition, the unitary body 101 may also include additional stylus pen support slots (125-1, 125-2) disposed along each end of the stylus pen slot 125 for providing additional mechanical fastening support to secure the stylus pen (not shown) to the unitary body 101 when inserted therein.

Figure 5A:
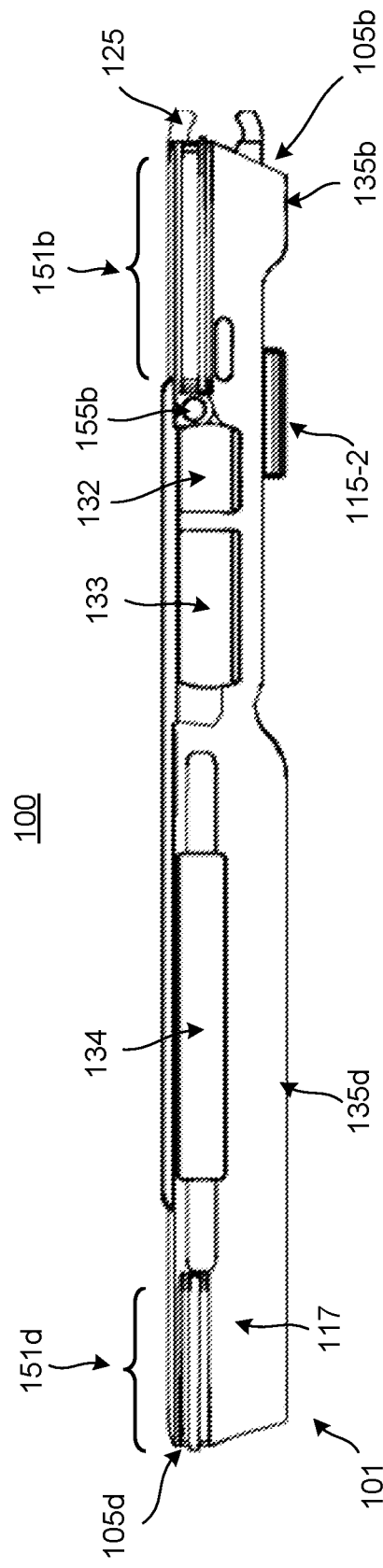
FIG. 5A and FIG. 5B illustrate a right side view and a left side view, respectively, of the resilient protective case, according to an embodiment.
Figure 5B:
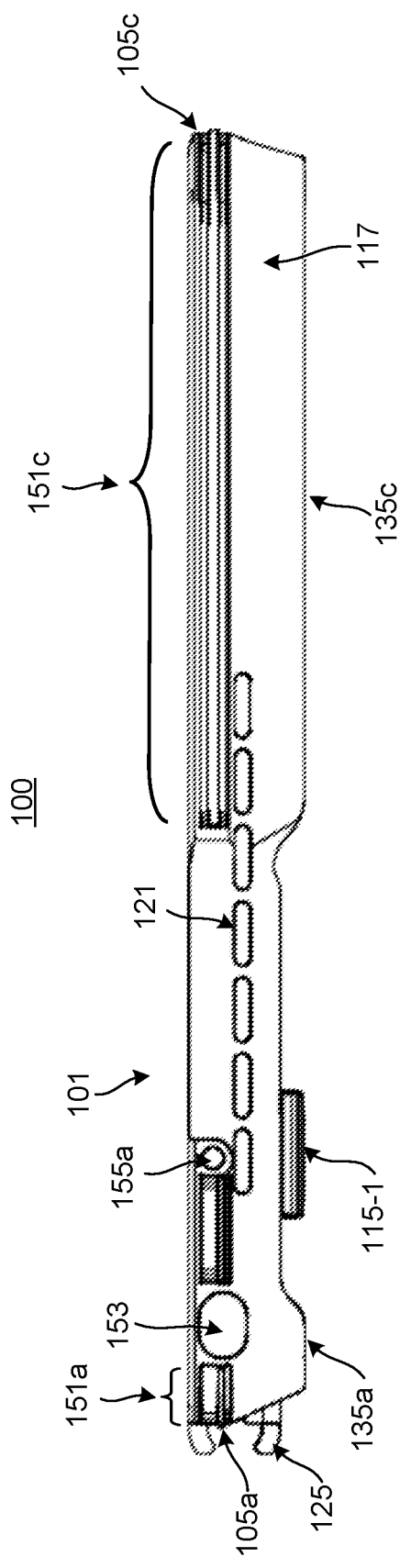

FIG. 5A and FIG. 5B illustrate a right side view and a left side view, respectively, of the resilient protective case 100, according to an embodiment. Each shock-absorbing corner members (105*a*-*d*) may be structured to have ribbed members (151*a*-*d*) composed of raised bands or alternating stacked layers for augmenting its strength and impact-absorbing properties along the corners and sidewalls of the unitary body 101. In addition, each shock-absorbing corner member (105*a*-*d*) may include air pockets applied to its interior for the purpose of absorbing impact and reducing shock along each corner. In another embodiment, the unitary body 101 may include a headset slot 153 disposed along a portion of the outer frame 102 for allowing a headset jack (not shown) to be connected to a headset jack port in the mobile computer device when encased by the resilient protective case 100. In yet another embodiment, the unitary body 101 may include side keyboard restraining slots (155*a*, 155*b*) disposed along a portion of the outer frame 102 proximate to a top side of the unitary body 101. Each side keyboard restraining slot (155*a*, 155*b*) is configured to receive a keyboard restraining band which will be discussed later in this document.

Figure 6A:
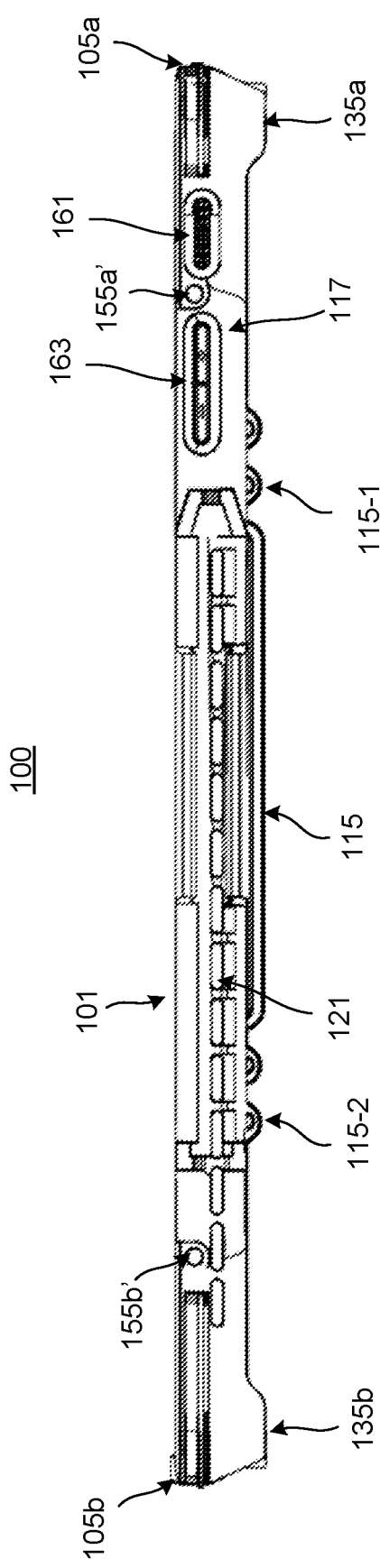
FIG. 6A and FIG. 6B illustrate a top side view and a bottom side view, respectively, of the resilient protective case, according to an embodiment.
Figure 6B:
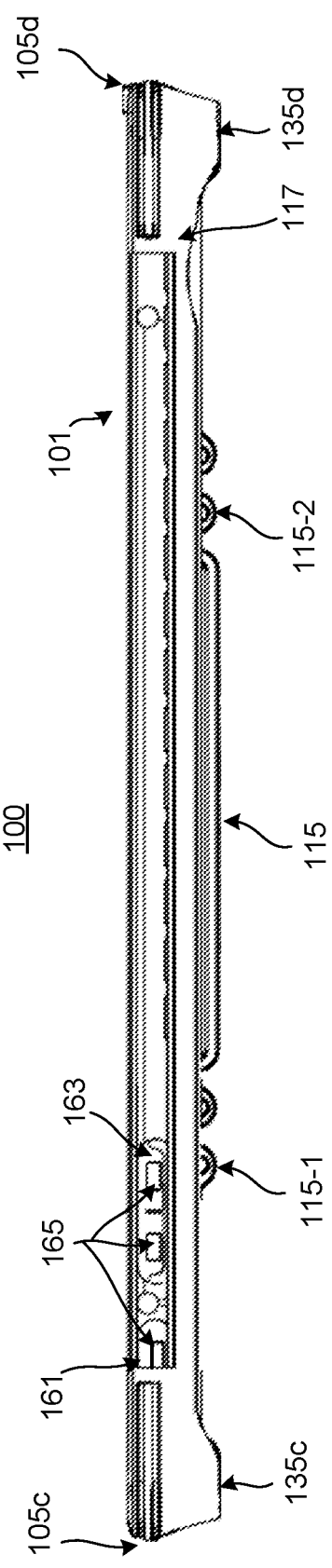

FIG. 6A and FIG. 6B illustrate a top side view and a bottom side view, respectively, of the resilient protective case 100, according to an embodiment. The unitary body 101 may also have integrated push button tabs including a power push button tab 161 and a volume control push button tab 163 disposed on the top side of the unitary body 101 along a portion of the outer frame 102. As shown in FIG. 6B, each push button tab (161, 163) may include at least one interior protruding member 165 to operate the power and volume switches on the mobile computer device when encased by the resilient protective case 100. In another embodiment, the unitary body 101 may also include top keyboard restraining slots (155*a*', 155*b*') disposed near each corner along the top side of the unitary body 101. Each top keyboard restraining slot (155*a*', 155*b*') is configured to receive a keyboard restraining band which will be discussed later in this document. Furthermore, all keyboard restraining slots (155*a*, 155*b*, 155*a*', 155*b*') are structured as circular apertures having approximately the same circular circumference.

Figure 7:
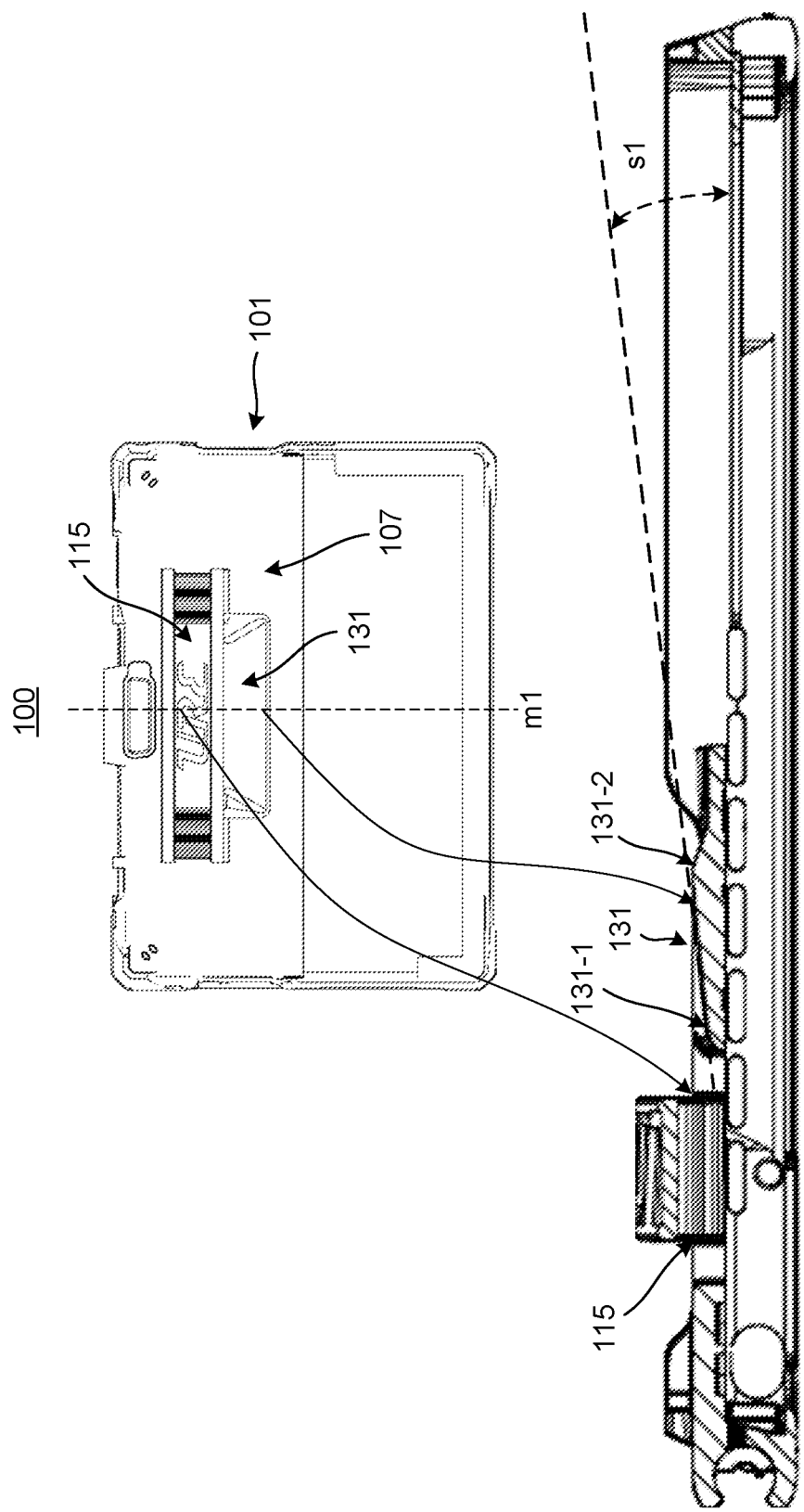
FIG. 7 illustrates a cross-sectional view of the resilient protective case along a middle section thereof, according to an embodiment.

FIG. 7 illustrates a cross-sectional view of the resilient protective case 100 along a middle section m1 thereof, according to an embodiment. In the cross-sectional view, the hand insertion ramp 131 includes a first end 131-1 disposed along the same plane as the strap 115 and a second end 131-1 disposed along a second plane that is slightly higher than the plane as the strap 115, forming a shallow slope s1 of approximately 10-15 degrees.

Figure 8A:
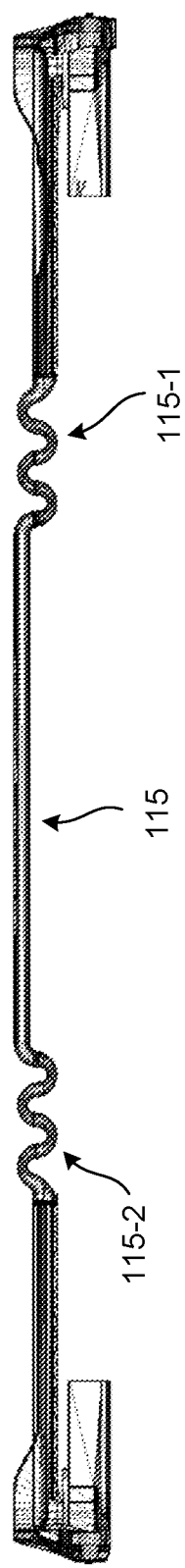
FIG. 8A and FIG. 8B illustrate a side views of the strap in its natural undeformed elastic state and its deformed elastic state, according to an embodiment.
Figure 8B:
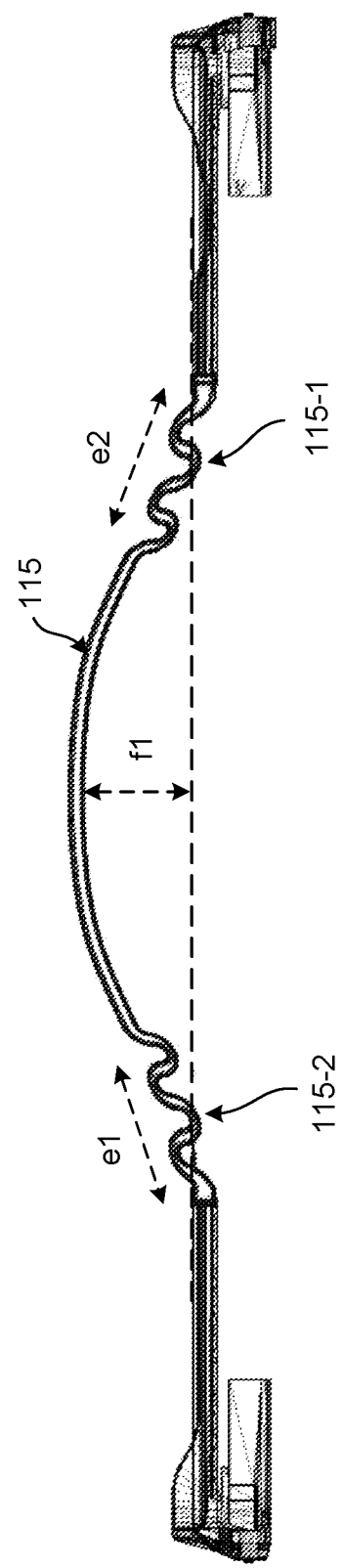

FIG. 8A and FIG. 8B illustrate a side views of the strap 115 in its natural undeformed elastic state (FIG. 8A) and its deformed elastic state (FIG. 8B), according to an embodiment. In its natural undeformed elastic state (FIG. 8A), the strap 115 remains flat and planar to the surface of the back support member 107, always returning to its state when no stress is applied to the strap 115. In its deformed elastic state (FIG. 8B), the strap 115 may stretch upwards f1 relative to the surface of the back support member 107 when stress is applied to the strap 115 such as when the user inserts their hand into the strap 115. To reduce the stress on the strap 115 corrugated expansion members (115-1, 115-2) are configured to outwardly expand (e1, e2) reducing the tensional forces to the strap 115, thereby reducing wear and tear, and increasing longevity to the strap.

Figure 9:
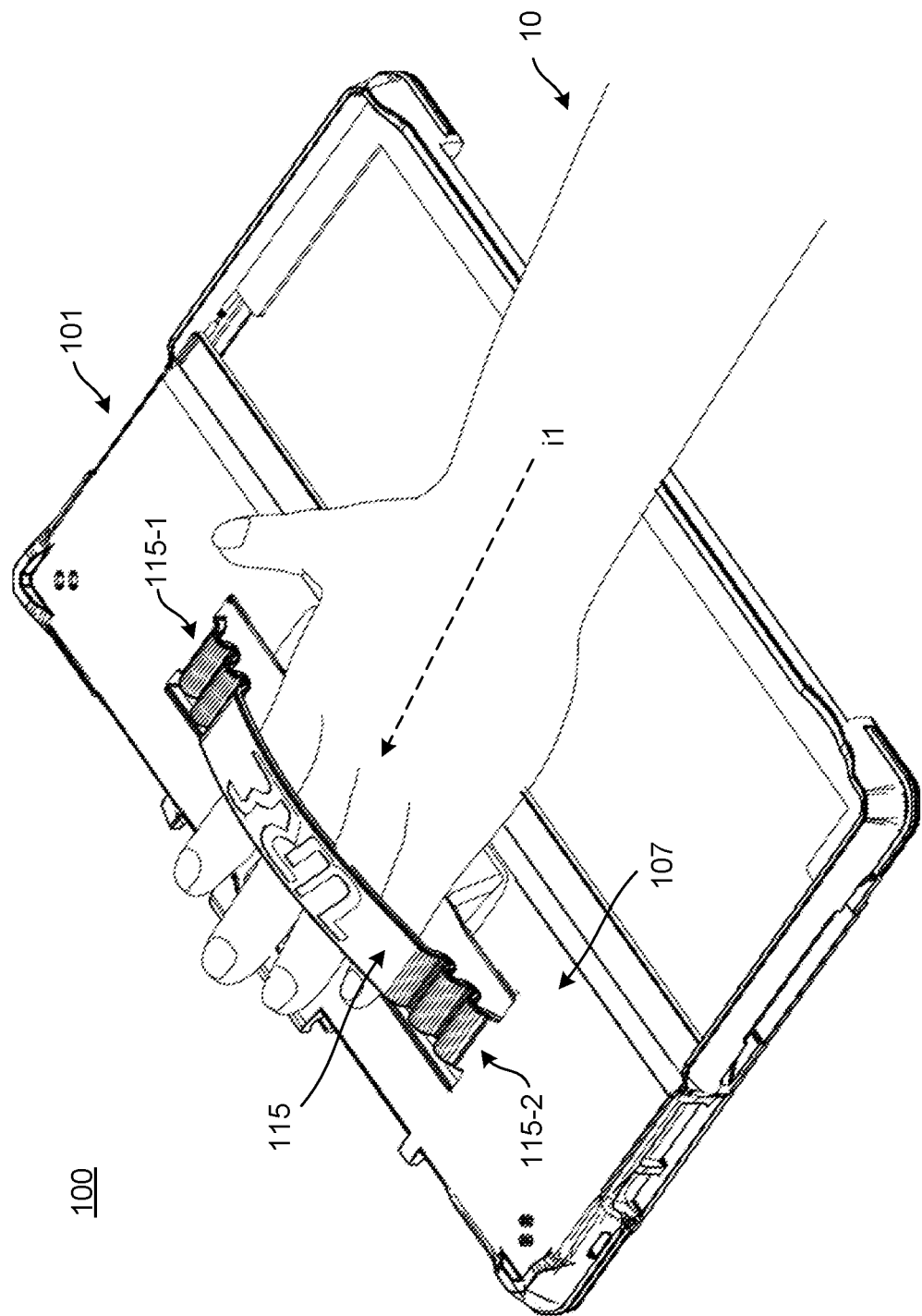
FIG. 9 illustrates a back perspective view of the resilient protective case with the hand of a user inserted beneath the strap, according to an embodiment.

FIG. 9 illustrates a back perspective view of the resilient protective case 100 with the hand of the user 10 inserted beneath the strap 115, according to an embodiment. In a typically application, the user 10 may insert their hand beneath the strap 115 by first slipping their fingers through the lower hand insertion slot 116b and then through the upper hand insertion slot 116a, starting near the bottom of the protective case 100 and moving an upward direction i1 towards to the top of the protective case 100. In one application, the strap 115 may apply non-slip materials, including textured materials or non-slip resins, to improve the user's grip to the strap 115, preventing the hand from slipping when inserted into the strap 115. In another application, multiple straps may be formed along the back support member 107 providing additional support members for carrying the mobile computer device when encased by the resilient protective case 100.

FIG. 10A-FIG. 10D illustrate a front (FIG. 10A), top (FIG. 10B), side (FIG. 10C), and perspective (FIG. 10D) views of a keyboard restraining band 200 which is configured to be applied to the pair of keyboard restraining slots (155a, 155a') and (155b, 155b') disposed on the resilient protective case 100, according to an embodiment. The keyboard restraining band 200 may include a t-shaped body 201 having a push-pull tab member 201-1 centrally disposed between two lateral arm members (201-1a, 201-1b). Push-in hole plug fasteners (203a, 203b) are disposed at a distal end (201-2a, 201-2b) of each lateral arm member (201-1a, 201-1b). Each push-in hole plug fastener (203a, 203b) may include a plug shaft member (203a-1, 203b-1) coupling the distal end (201-2a, 201-2b) of each lateral arm member (201-1a, 201-1b) to a conical frustum plug member (203a-3, 203b-3). In one implementation, the push-pull tab member 201-1 is configured to be rotated at least 45 degrees (a1) relative to a vertical center plane (c1) disposed between each push-in hole plug fastener (203a, 203b) when attached to keyboard restraining slots (155a, 155a') and (155b, 155b'), allowing it to snap into a locked band position or unsnap into an unlocked band position.

In another implementation, each conical frustum plug member (203a-3, 203b-3) is structured to have a first circular aperture along a first plane having approximately the same circular circumference as the keyboard restraining slots (155a, 155b, 155a', 155b') and a second circular aperture along a second plane having a larger circular circumference than the keyboard restraining slots (155a, 155b, 155a', 155b').

The keyboard restraining band 200 is preferably manufactured in a single mold process with the resilient protective case 100 from the same flexible plastic or rubber based material as the resilient protective case 100, which may include TPE and TPU materials. Advantageously, the design and flexibility of the keyboard restraining band 200 allows easy attachment and detachment to the keyboard restraining slots (155a, 155b) and (155a', 155b') when applied to the resilient protective case 100.

Figure 11:
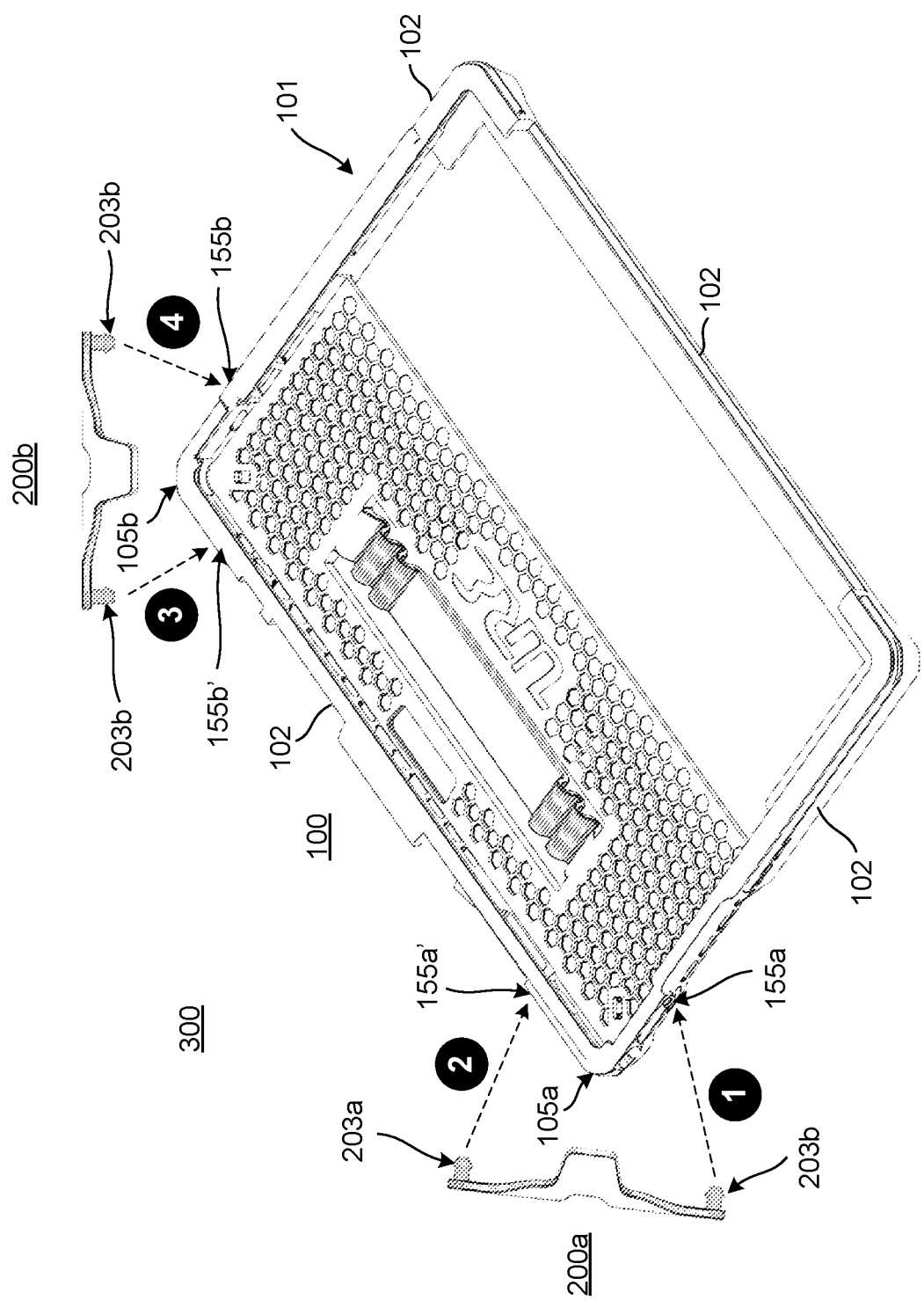
FIG. 11 illustrates an example of a 4-point keyboard restraining system using two keyboard restraining bands on the resilient protective case, according to an embodiment.

FIG. 11 illustrates an example of a 4-point keyboard restraining system 300 using two keyboard restraining bands (200a, 200b) on the resilient protective case 100, according to an embodiment. In the 4-point keyboard restraining system 300, a keyboard (not shown) may be restrained to the unitary body 101 along 4-points (1-4) by the first keyboard restraining band 200a which attaches near the first top corner 105a of the resilient protective case 100 and the second keyboard restraining band 200a which attaches near the second top corner 105b of the resilient protective case 100. The push-in hole plug fasteners (203a, 203b) for each keyboard restraining bands (200a, 200b) may be inserted into the keyboard restraining slots (155a, 155a') and (155b, 155b') securing it to the unitary body 101 along both top corners (105a, 105b) as shown in FIG. 11. In one implementation, the two keyboard restraining bands (200a, 200b) are configured to be detachable from the unitary body 101, allowing the user to easily attach the two keyboard restraining bands (200a, 200b) from the unitary body 101 when the keyboard is attached to the mobile computer device or easily remove the two keyboard restraining bands (200a, 200b) when the keyboard is unavailable or not in use. In another implementation, the keyboard restraining bands (200a, 200b) may be physically inseparable from the unitary body 101, fabricated and constructed from a single-piece mold. However, the keyboard restraining bands (200a, 200b) are not so limited to and instead, may be positioned elsewhere, reshaped, resized, or eliminated entirely as needed or required.

Figure 12:
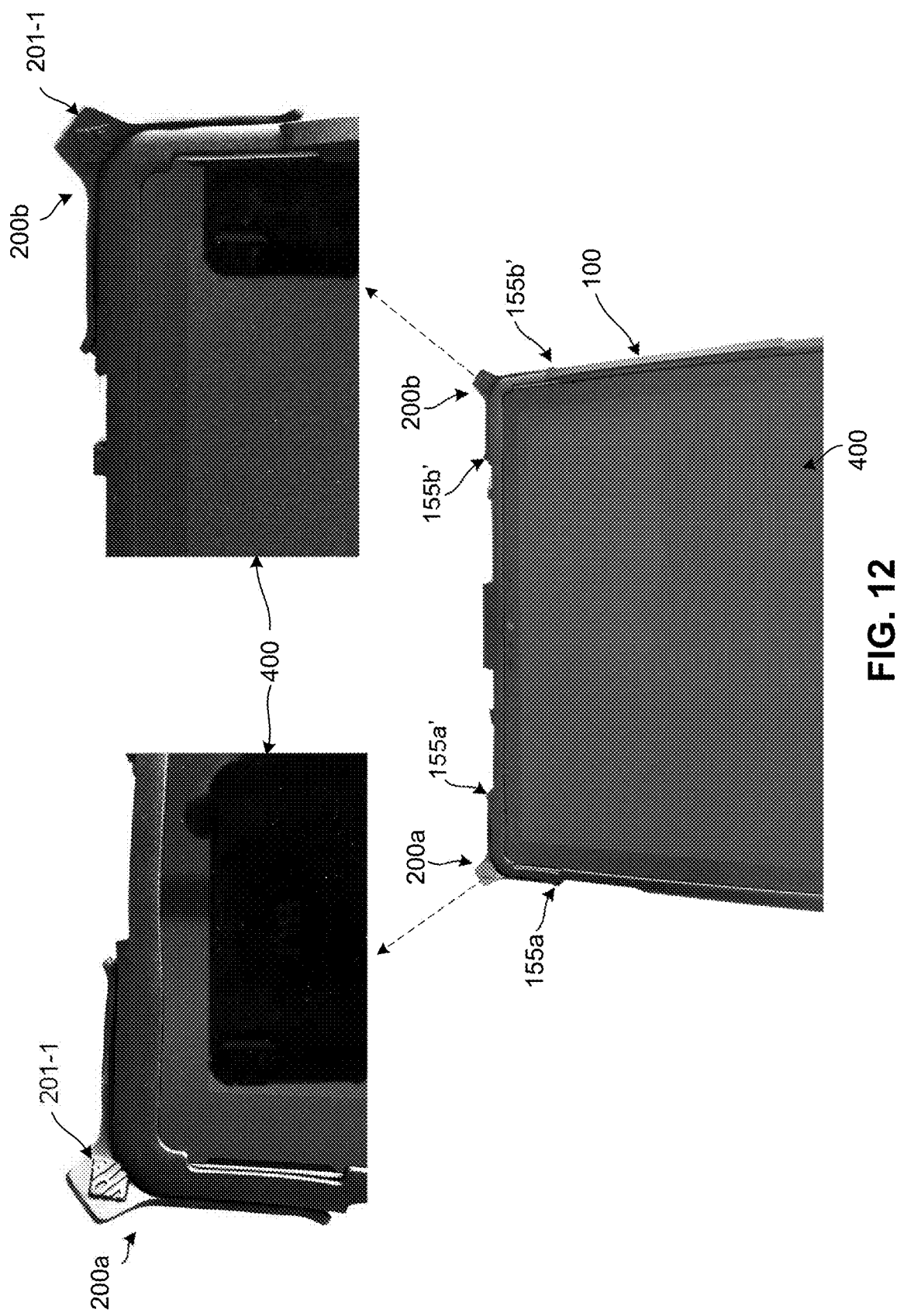
FIG. 12 illustrates photographs of the two keyboard restraining bands of the 4-point keyboard restraining system disposed in an unlocked band position with a mobile computer device and keyboard encased by the resilient protective case, according to an embodiment.

FIG. 12 illustrates photographs of the two keyboard restraining bands (200a, 200b) of the 4-point keyboard restraining system 300 disposed in an unlocked band position with a mobile computer device 400 encased by the resilient protective case 100, according to an embodiment. In the unlocked band position, the two keyboard restraining bands (200a, 200b) are disposed in an upward and slanted position as shown in FIG. 12. In practice, the user may pull-up and then rotate the push-pull tab member 201-1 of each keyboard restraining bands (200a, 200b) to place the restraining bands (200a, 200b) in the unlocked band position, thereby allowing a user to apply and attach a keyboard to the mobile computer device 400 while encased by the protective case 100.

Figure 13:
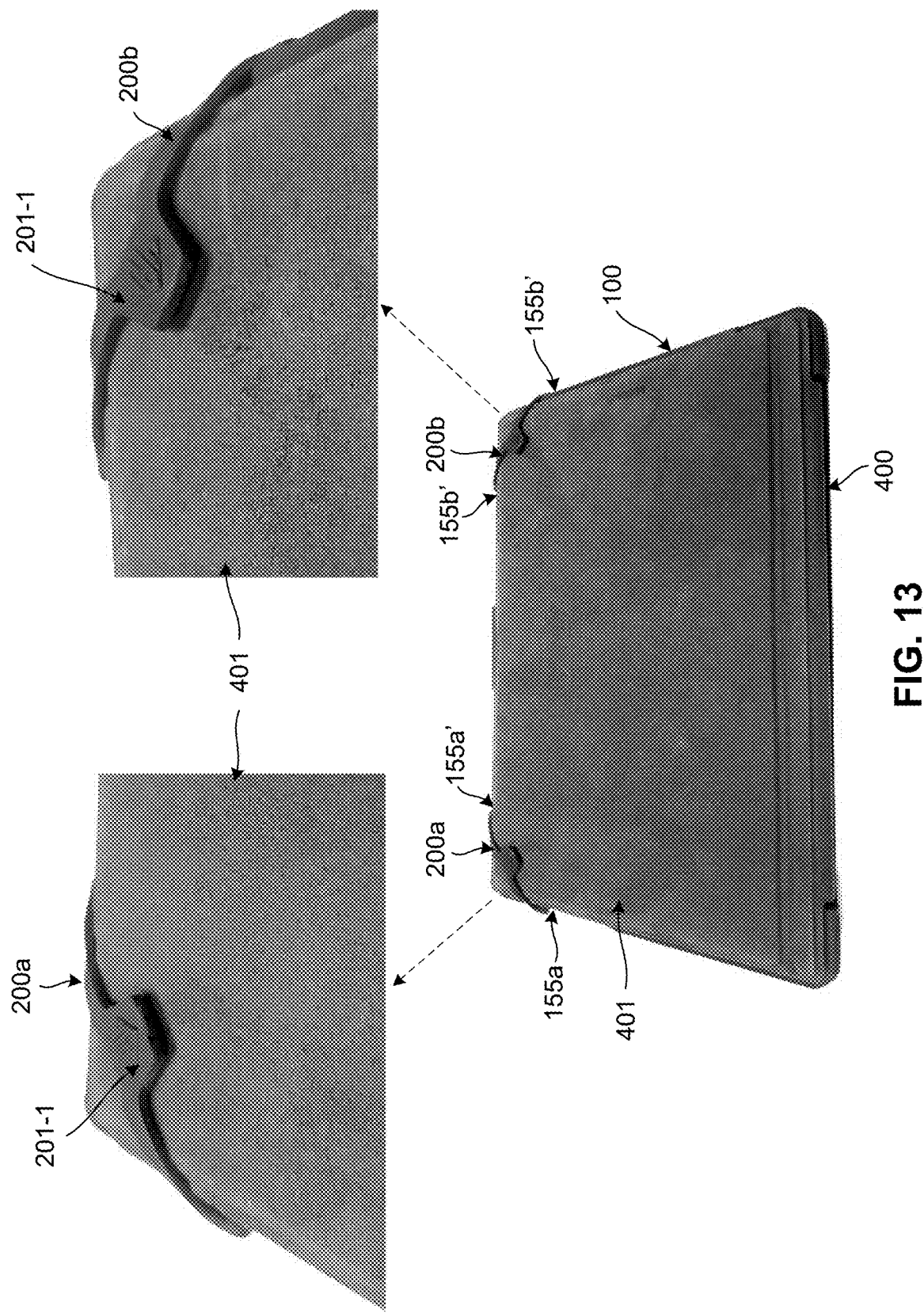
FIG. 13 illustrates photographs of the two keyboard restraining bands of the 4-point keyboard restraining system disposed in a locked band position onto a mobile computer device and keyboard both encased by the resilient protective case, according to an embodiment.

FIG. 13 illustrates photographs of the two keyboard restraining bands (200a, 200b) of the 4-point keyboard restraining system 300 disposed in a locked band position onto a mobile computer device 400 and optional detachable keyboard 401 both encased by the resilient protective case 100, according to an embodiment. In the locked band position, the keyboard 401 is secured by the two keyboard restraining bands (200a, 200b) along the top corners of the protective case 100 as shown in FIG. 13. In operation, the user may rotate and then pull the push-pull tab portion 201-1 of each keyboard restraining band (200a, 200b) over the corners of the detachable keyboard 401 to secure the restraining bands (200a, 200b) in the locked band position, thereby preventing the detachable keyboard 401 from unintentionally unfolding from the mobile computer device 400 while encased by the protective case 100.

Figure 14:
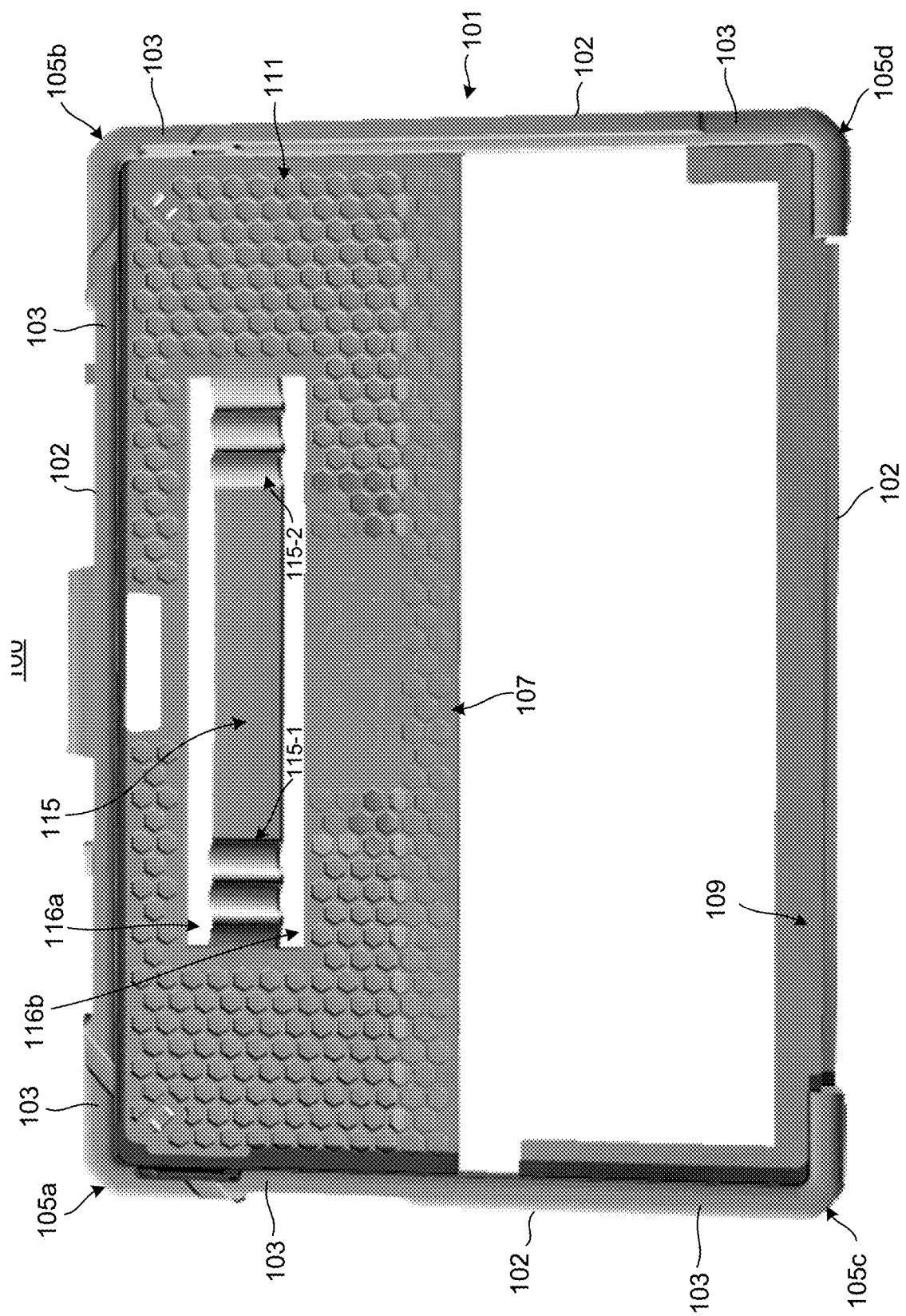
FIG. 14 illustrates a front side view of a three-dimensional image of the resilient protective case, according to an embodiment.

FIG. 14 illustrates a front side view of a three-dimensional image of the resilient protective case 100, according to an embodiment. Many of the features of the unitary body 101 previously presented are once again illustrated in this front side three-dimensional view, demonstrating an enhanced visual appearance including relative dimensions, shape and shading of such features in a realistic environment. Some of these notable features shown in FIG. 14 include, for example, the outer frame 102, the back support member 107, the one-piece integrated hand strap 115, corrugated expansion members (115-1, 115-2), and shock-absorbing corner members (105a-d).

Figure 15:
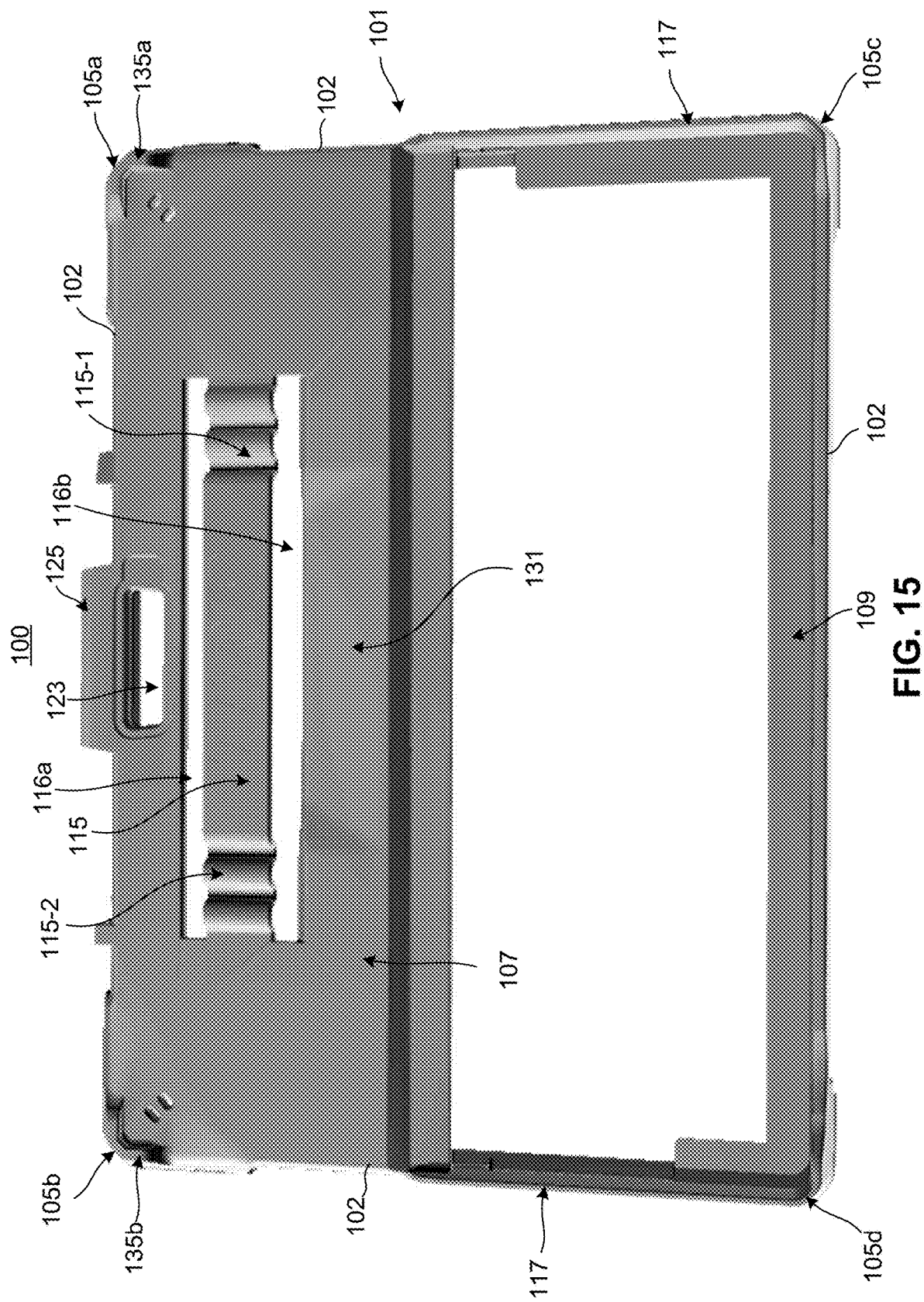
FIG. 15 illustrates a back side view of a three-dimensional image of the resilient protective case, according to an embodiment.

FIG. 15 illustrates a back side view of a three-dimensional image of the resilient protective case 100, according to an embodiment. Many of the features of the unitary body 101 previously presented are illustrated in this back side three-dimensional view, demonstrating an enhanced visual appearance including relative dimensions, shape and shading of such features in a realistic environment. Some of these notable features shown in FIG. 15 include, for example, the outer frame 102, the back support member 107, the one-piece integrated hand strap 115, corrugated expansion members (115-1, 115-2), the camera slot 123, the peripheral member 117, and shock-absorbing corner members (105a-d).

Figure 16:
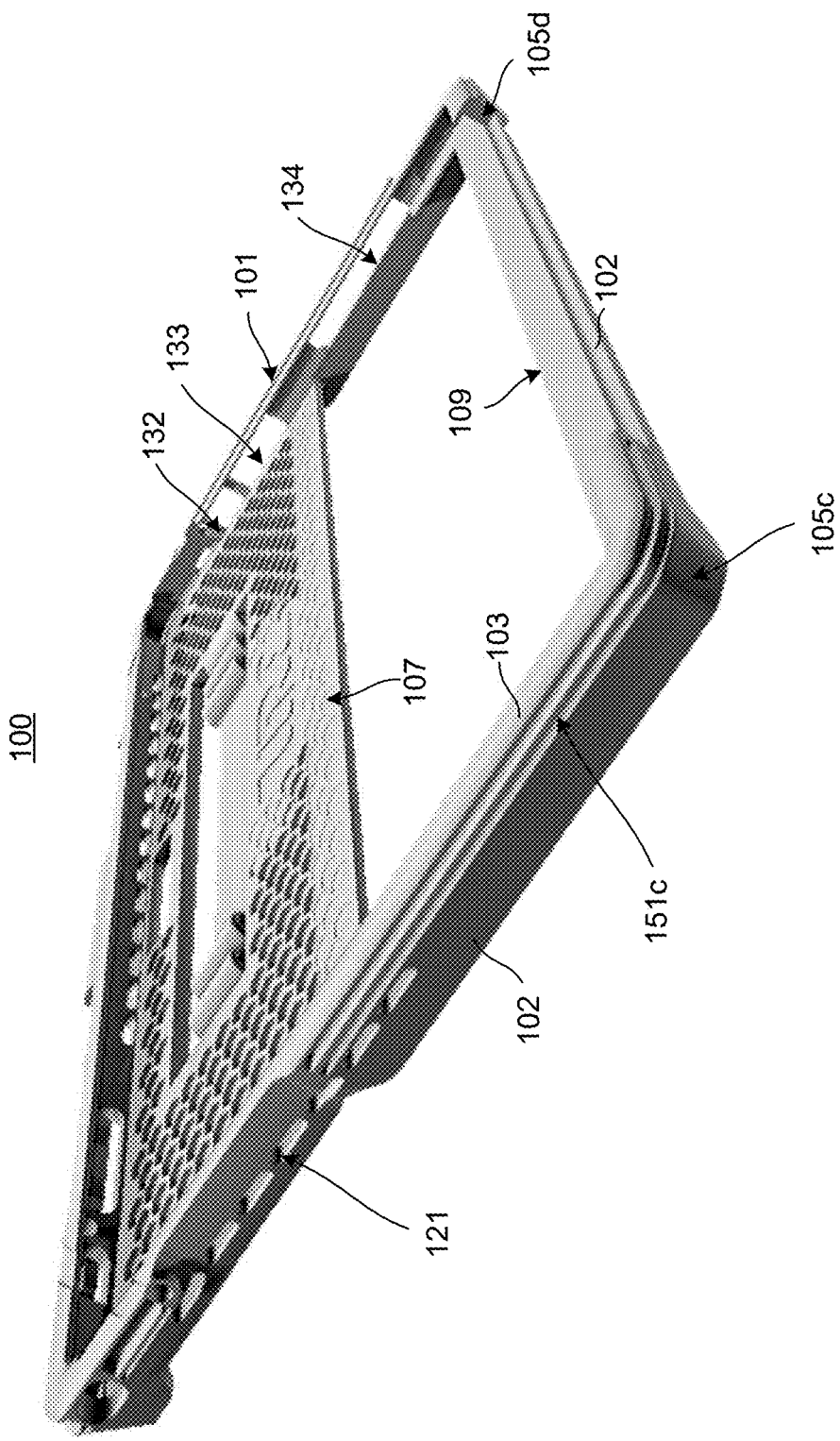
FIG. 16 illustrates a left-side perspective view of a three-dimensional image of the resilient protective case, according to an embodiment.

FIG. 16 illustrates a left-side perspective view of a three-dimensional image of the resilient protective case 100, according to an embodiment. Many of the features of the unitary body 101 previously presented are illustrated in this left-side three-dimensional, demonstrating an enhanced visual appearance including relative dimensions, shape and shading of such features in a realistic environment. Some of these notable features shown in FIG. 16 include the air vents 121, ribbed member 151c, and shock-absorbing corner member 105c.

Figure 17:
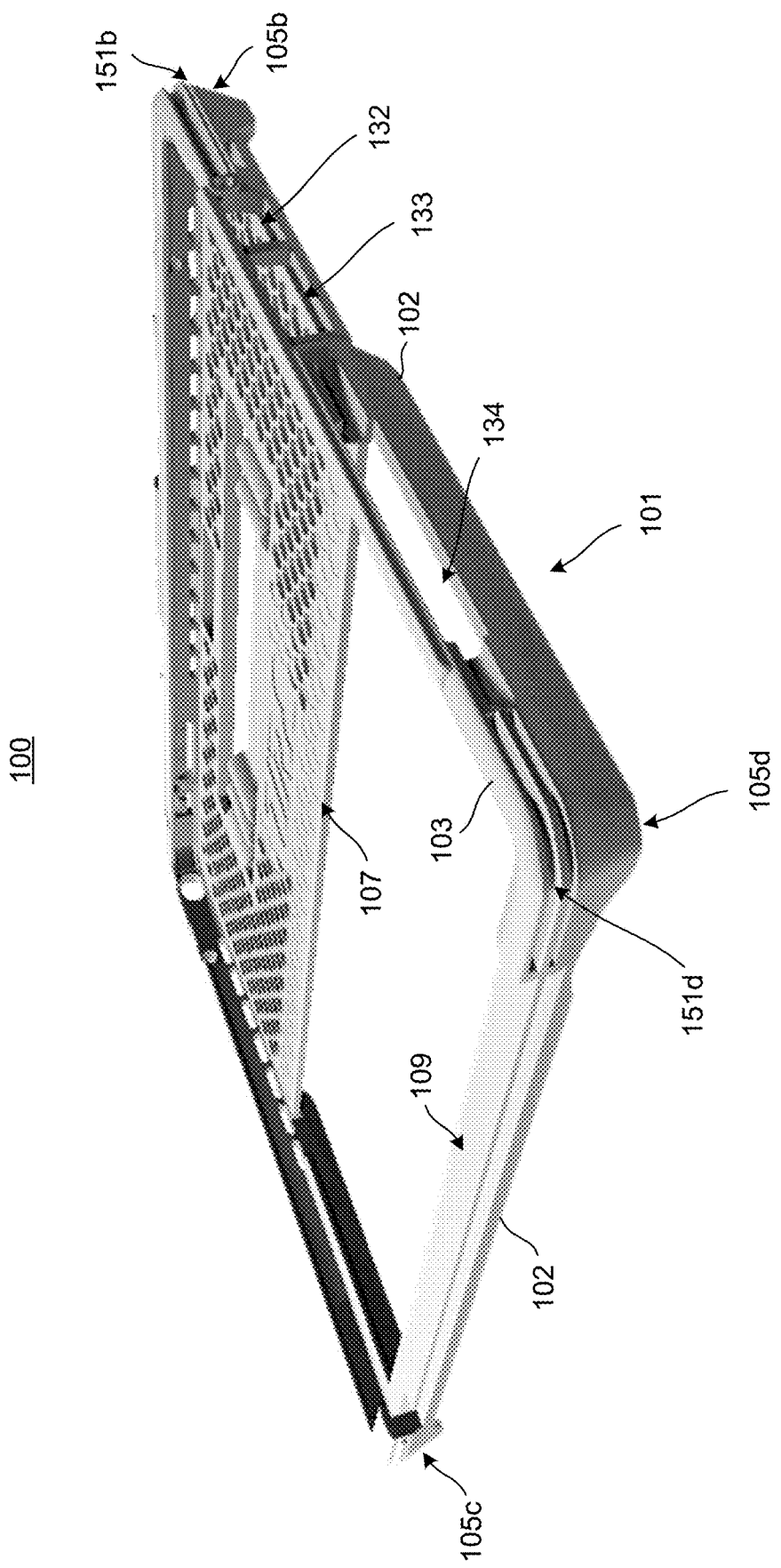
FIG. 17 illustrates a right-side perspective view of a three-dimensional image of the resilient protective case, according to an embodiment.

FIG. 17 illustrates a right-side perspective view of a three-dimensional image of the resilient protective case 100, according to an embodiment. Many of the features of the unitary body 101 previously presented are illustrated in this right-side three-dimensional view, demonstrating an enhanced visual appearance including relative dimensions, shape and shading of such features in a realistic environment. Some of these notable features shown in FIG. 17 include serial slots (132, 133), the power/memory card slot 134, ribbed members (151b, 151d), and shock-absorbing corner members (105b, 105d).

FIG. 18A-FIG. 18B illustrate a top view and bottom view of three-dimensional images of the resilient protective case 100, according to an embodiment. Many of the features of the unitary body 101 previously presented are illustrated in the top view and bottom three-dimensional views, demonstrating enhanced visual appearances including relative dimensions, shape and shading of such features in a realistic environment. Some of these notable features shown in FIG. 18A and FIG. 18B include the stylus pen slot 125, ribbed members (151a-d), and multiple post members (135a, 135b, 135c, and 135d).

Figure 19:
FIG. 19 illustrates a photograph of a top perspective view of the mobile computer device with optional keyboard encased by the resilient protective case, according to an embodiment.

FIG. 19 illustrates a photograph of a top perspective view of the mobile computer device 400 with an optional detachable keyboard 401 encased by the resilient protective case 100, according to an embodiment. Advantageously, the resilient protective case 100, which covers the corners, edges and back of the mobile computer device 400, allows optimum shock protection by absorbing impact, preventing damage to both the screen, detachable keyboard 401, and electronics integrated within the mobile computer device 400 should the user accidentally drop the device. Another benefit of the resilient protective case 100 includes having a slim and attractive case design into which the mobile computer device 400 is easily and securely inserted. Yet another benefit includes the flexible, elastic, non-slip material of the protective case 100 that is easy to grip. Moreover, the protective case 100 may be sold at a lower price since it can be manufactured at lower cost, requiring only a single-mold processing step.

Figure 20:
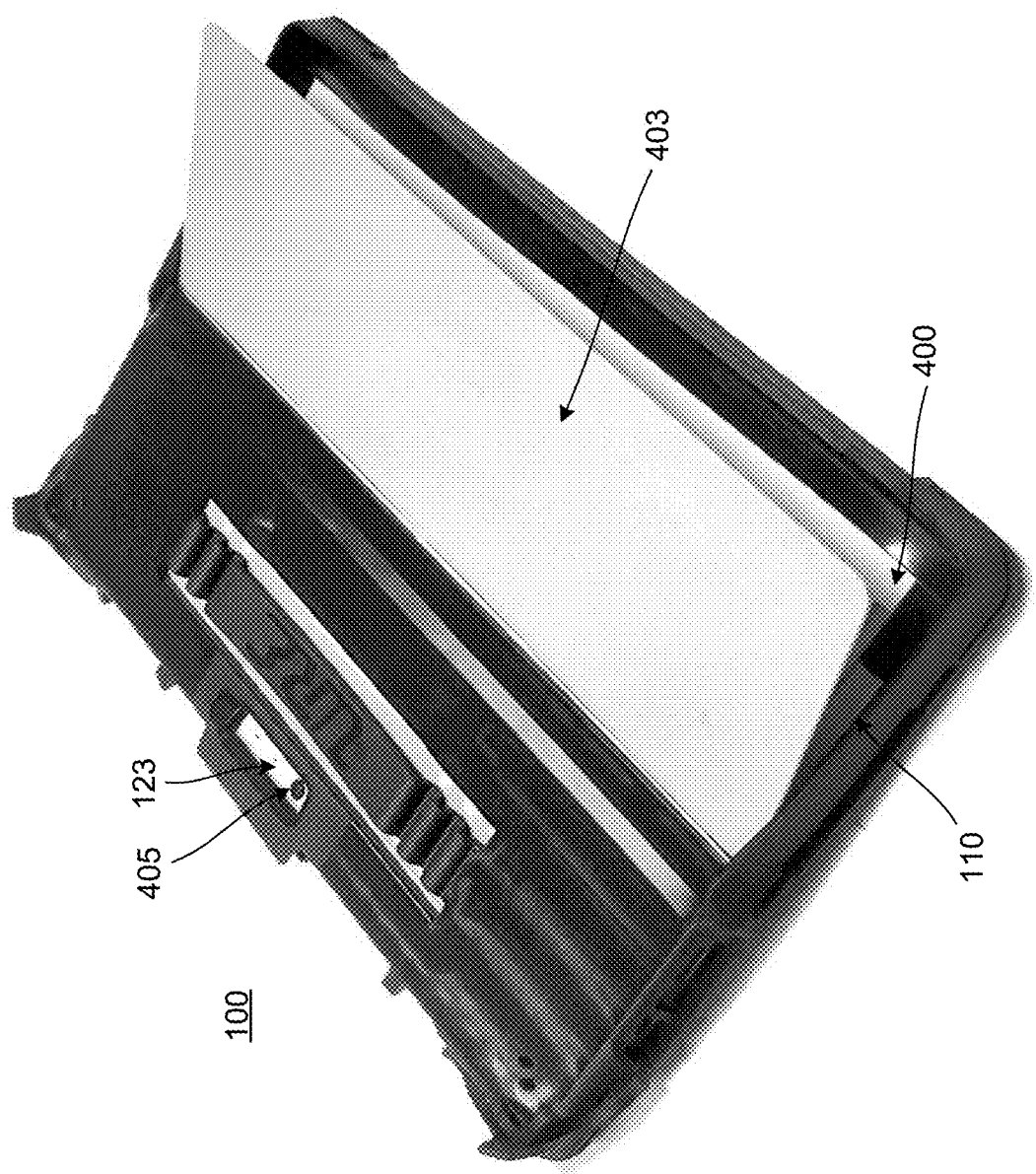
FIG. 20 illustrates a photograph of a back side view of the mobile computer device encased by the resilient protective case, according to an embodiment.

FIG. 20 illustrates a photograph of a back side view of the mobile computer device 400 encased by the resilient protective case 100, according to an embodiment. In yet another application, the resilient protective case 100 includes ports and slots such as the kickstand slot 110 and camera slot 123 that are configured to provide access and functionality to a kickstand 403 and a backside camera 405 of the mobile computer device 400.

In view of the present disclosure, a primary benefit and advantage of the resilient protective case 100 include at least the integrated strap 115, which is manufactured as one-piece assembly via a single plastic injected molding, requiring no overmolding and eliminating any secondary or post-processing fabrication steps. In addition, the 4-point keyboard restraining system 300 using two keyboard restraining bands (200a, 200b) on the resilient protective case 100 is smartly configured to secure an optional detachable keyboard of the mobile computer device to the case 100 when applied therein. It is to be understood that protective case 100 is depicted for illustrative purposes only and various other electronic devices are applicable including other computer devices such as mobile phone, laptop, notebooks or tablet having various components, sizes, and/or shapes.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present disclosure. Although the present disclosure has been shown and described with respect to several preferred embodiments thereof, various changes, omissions, and additions to the form and detail thereof, may be made therein, without departing from the spirit and scope of the disclosure. It is understood that the words which have been used herein are words of description and illustration, rather than words of limitation. Changes may be made, within the purview of the appended claims, as presently stated and as amended, without departing from the scope and spirit of the present disclosure in its aspects.

Other embodiments and modifications of the present disclosure may occur to those of ordinary skill in the art in view of these teachings. Accordingly, the disclosure is to be limited only by the following claims which include all other such embodiments and modifications when viewed in conjunction with the above specifications and accompanying drawings.

What is claimed is:

1. A protective case for receiving and protecting a mobile computer device, comprising: a unitary body having a one piece assembly wherein the unitary body includes an outer frame having retaining members for securing the mobile computer device therein, a backside support member disposed between two lateral frame members of the outer frame wherein the backside support member includes an upper slot and a lower slot, and an integrated strap disposed in the backside support member, wherein the upper slot is separated from the lower slot by the integrated strap, wherein corrugated expansion members are disposed at distal end portions of the integrated strap, and wherein a hand insertion ramp having a gradually sloping plane is disposed below the integrated strap and the lower slot.

2. The protective case of claim 1, wherein the corrugated expansion members are configured to outwardly expand with minimal tensional forces to the integrated strap, thereby reducing the tensional forces to the integrated strap when a hand is inserted therein.

3. The protective case of claim 1, wherein the hand insertion ramp provides an entry point for lifting the integrated strap along the lower slot by a hand of a user.

4. The protective case of claim 1, wherein the outer frame is substantially rectangular in shape having four corners with shock-absorbing corner members disposed along a portion of each corner.

5. The protective case of claim 4, wherein each shock-absorbing corner member includes ribbed members having raised bands or alternating stacked layers for increasing strength and impact-absorbing properties along each corner.

6. The protective case of claim 4, wherein each shock-absorbing corner member has a hollow interior forming air pockets for the purpose of absorbing impact and reducing shock along each corner.

7. The protective case of claim 1, wherein the back support member includes a plurality of hexagonally shaped air pocket structures that are integrated into and uniformly distributed across a portion of the back support member, providing shock-absorbing properties to the back support member of the unitary body.

8. The protective case of claim 1, wherein a plurality of air vents is disposed along a side portion and a top portion of the outer frame.

9. The protective case of claim 1, wherein a camera slot is disposed along a top portion of the outer frame.

10. The protective case of claim 1, wherein a stylus pen slot is disposed along a top portion of the outer frame.

11. The protective case of claim 1, wherein the unitary body is fabricated from either a thermoplastic elastomer material or a thermoplastic polyurethane material using a single injection molding process.

12. A protective case for receiving and protecting a mobile computer device, comprising: a unitary body having a one piece assembly wherein the unitary body includes an outer frame having retaining members for securing the mobile computer device therein, a backside support member disposed between two lateral frame members of the outer frame wherein the backside support member includes an upper slot and a lower slot, and an integrated strap disposed in the backside support member, wherein the upper slot is separated from the lower slot by the integrated strap, wherein corrugated expansion members are disposed at a distal end portions of the integrated strap, wherein keyboard restraining slots are disposed along two upper corners of the outer frame along a top portion and the two lateral frame members thereof.

13. The protective case of claim 12, wherein a 4-point keyboard restraining system having two keyboard restraining bands, wherein a first keyboard restraining band is configured to secure to a first set of keyboard restraining slots disposed along a first upper corner and a second keyboard restraining band is configured to secure to a second set of keyboard restraining slots disposed along a second upper corner.

14. The protective case of claim 13, wherein each keyboard restraining band includes a t-shaped body having a push-pull tab member centrally disposed between two lateral arm members of the t-shaped body and push-in hole plug fasteners disposed at a distal end of each lateral arm member.

15. The protective case of claim 14, wherein each push-in hole plug fastener includes a plug shaft coupling the distal end of each lateral arm member to a conical frustum plug member.

16. The protective case of claim 14, wherein each keyboard restraining slot is configured to receive a single push-in hole plug fastener.

17. The protective case of claim 14, wherein the keyboard restraining bands are detachably coupled to the keyboard restraining slots.

18. The protective case of claim 14, wherein the push-pull tab member is configured to be rotated at least 45 degrees, allowing it to snap into a locked band position or unsnap into an unlocked band position.

* * * * *